US006502063B1

(12) United States Patent
Eriksson et al.

(10) Patent No.: US 6,502,063 B1
(45) Date of Patent: Dec. 31, 2002

(54) METHOD AND APPARATUS FOR RECURSIVE FILTERING OF PARALLEL INTERMITTENT STREAMS OF UNEQUALLY RELIABLE TIME DISCRETE DATA

(75) Inventors: Stefan Eriksson, Stockholm (SE); Anders Furuskär, Stockholm (SE); Stefan Jäverbring, Haninge (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 09/454,220

(22) Filed: Dec. 9, 1999

(51) Int. Cl.[7] .............................................. G06F 15/00
(52) U.S. Cl. ...................................... 702/190; 375/346
(58) Field of Search ................................... 702/190, 191, 702/193, 194, 197, 199, 79; 708/320, 323; 375/346

(56) References Cited

U.S. PATENT DOCUMENTS

| 3,798,560 | A | * | 3/1974 | Taylor | 708/323 |
| 4,593,553 | A | | 6/1986 | Bonitz et al. | 73/35 |
| 5,357,449 | A | | 10/1994 | Oh | 364/551.01 |
| 5,442,407 | A | | 8/1995 | Iu | 348/620 |
| 5,844,949 | A | * | 12/1998 | Hershey et al. | 375/346 |
| 6,167,415 | A | * | 12/2000 | Fisher et al. | 708/320 |
| 6,175,849 | B1 | * | 1/2001 | Smith | 708/320 |

FOREIGN PATENT DOCUMENTS

EP  0 871 143 A1  10/1998

OTHER PUBLICATIONS

EPO; Sandard Search Report; Jun. 6, 2000.

* cited by examiner

Primary Examiner—Marc S. Hoff
Assistant Examiner—Mohamed Charioui
(74) Attorney, Agent, or Firm—Jenkens & Gilchrist, A Professional Corporation

(57) ABSTRACT

An apparatus and method for recursive filtering of time discrete measurement data relating to a measurable time-varying attribute to generate an estimated magnitude for the attribute at a particular time instant. Each measurement has an associated reliability indicator representing a relative reliability of the measurement. Using the individual reliability indicators and a time-weighted filtered reliability indicator for a prior time instant, a filtered reliability indicator for the current time instant is generated. The filtered reliability indicator for the current time instant is then used to reliability-weight a weighted average of the plurality of measurements and to reliability-weight a time-weighted estimated magnitude for the prior time instant. The weighted values are then used to generate an estimated magnitude of the time-varying attribute for the current time instant.

35 Claims, 4 Drawing Sheets

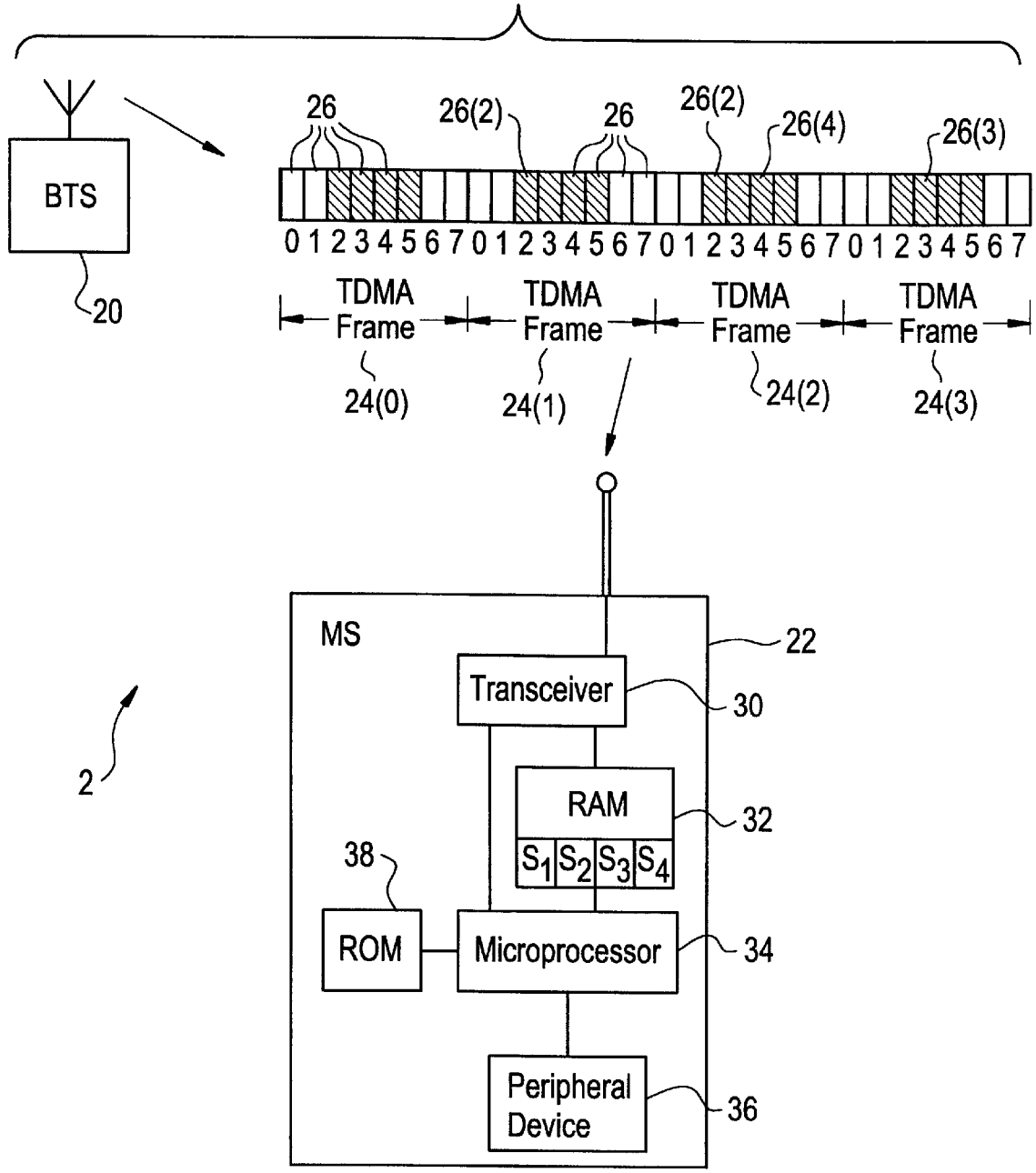

METHOD AND APPARATUS FOR RECURSIVE FILTERING OF PARALLEL INTERMITTENT STREAMS OF UNEQUALLY RELIABLE TIME DISCRETE DATA

BACKGROUND OF THE INVENTION

1. Technical Field of the Invention

The present invention relates in general to measurement systems, and in particular to processing and filtering of time discrete measurement data.

2. Description of Related Art

Frequently, in monitoring and control systems, there is a need to generate estimates of a magnitude of interest from multiple instantaneous measurements. If the measuring method adds uncertainty or noise, or if noise is present in the monitoring environment, filtering of a series of measurements is needed to generate a reliable or accurate estimate. Similarly, if the measured quantity varies with time, sometimes the average value, the trend, or the long term variations of the measured quantity, rather than the instantaneous value, are of interest. To generate such an average value, trend, or long term variation, filtering of instantaneous measurements is needed.

Generally, one or more sensors are used to measure the quantity of interest. The sensors can be any measuring equipment, wherein the measurements are sampled from the sensors at regular intervals. In many cases, not all sensors deliver measurements at every sampling instant, or individual measurements might be discarded from some reason. Furthermore, each individual measurement might not be equally reliable. As a result, each measurement can have an associated reliability, which can be a function of the reliability of the particular measurement and/or the reliability of the sensor. To generate an accurate or reliable estimate of the quantity of interest, it is important to consider the reliability of each measurement during the estimation procedure.

When a time variant quantity is to be estimated, it is often desirable to rely, at least in part, on historical measurements to generate a more reliable estimate of the current quantity. Typically, measurements made recent in time are more relevant to the current estimate than earlier measurements. As a result, more recent measurements should be given more importance or weight during the estimation process. This weighting procedure can be exemplified by an estimator that gradually forgets old measurements as new measurements are received. One way to achieve this result is to use historical weights that decrease exponentially with time. Thus, if two measurements are separated by n time instants (corresponding to a time difference of t–nT seconds, where T is the time between consecutive time instants and t is the time of the later measurement), the older of the two measurements are considered $(1-\beta)^n$ times less important, where $\beta$ is a parameter called the forgetting factor. The value of the forgetting factor determines how fast the estimator forgets old measurements and must be a number between 0 and 1, where values close to 1 result in an estimator that forgets quickly.

A similar situation is presented when the sensors deliver measurements of different quantities. It might then be of interest to collect the measurements on a per sensor basis, but to also average the measurements over all of the sensors. Such a situation might arise, for example, when a temperature sensor is installed in each room in a building. The filtering and averaging process should then take into account the reliability of each individual sensor and its corresponding measurement when estimating the overall temperature.

A common method of generating estimates is to filter measurements through an auto-regressive filter:

$$S_n = (1-\beta)S_{n-1} + \beta m_n \quad (1)$$

where $m_n$ is the average of measurements over the sensors at time instant n, and $S_n$ is the estimate of the measured quantity at time instant n. Problems arise, however, when measurements are missing, which causes the number of existing measurements to vary with time. In particular, a large number of measurements at a first time instant will not be given more weight than a small number of measurements at a second time instant. This problem is further exacerbated when no measurements exist for some sampling instants. Moreover, this filtering method does not take into account the reliability of the measurements.

A similar approach would be to filter the measurements from each sensor through separate auto-regressive filters and calculate the average of the filter outputs. This procedure, however, will suffer from the same problems as the previous method.

Another alternative might be to store historical measurements and to calculate the current estimate using both the current and historical measurements. Again, however, such a method would suffer from the same problems discussed above. Furthermore, this method would also require relatively large amounts of memory and would increase the computational complexity of the estimation procedure.

There is a need, therefore, for a method and apparatus that would filter measurements in an efficient way (i.e., with low memory requirements and low computational complexity). Preferably, such a method would provide an average of measurements over all of the sensors and would take into account historical measurements, with the weight of the historical measurements decreasing exponentially with time. Moreover, it would be desirable for the filtering method and apparatus to take into account only the existing measurements (i.e., corresponding to those sampling instants in which measurement data is received) together with an associated reliability of the measurements.

SUMMARY OF THE INVENTION

The present invention comprises an apparatus and method for recursively filtering measurement data. The apparatus and method operate to generate an unbiased average of measurements from one or more sensors. The weight of historical measurements and their corresponding reliability indicators in the unbiased average decrease exponentially with time. In addition, the apparatus and method account for measurements that are intermittent or unequally reliable.

The apparatus of the invention includes a buffer for storing measurements of a time-varying attribute that are made during a particular time instant. Each measurement has an associated reliability indicator representing a relative reliability of the measurement. The apparatus further includes a memory for storing filtering instructions, which are used to generate an estimated magnitude for the time-varying attribute at the particular time instant, and a processor for filtering the plurality of measurements in accordance with the filtering instructions. In particular, the processor operates to time-weight a historical estimated magnitude of the time-varying attribute and to generate a weighted average of the plurality of measurements using the reliability indicators associated with the plurality of measurements. Using the time-weighted historical estimated magnitude, the processor generates an estimated magnitude of the time-varying attribute for the particular time instant.

In accordance with the method of the invention, time discrete measurement data relating to a measurable time-varying attribute is filtered to generate an estimated magnitude for the attribute at a particular time instant. One or more measurements of the time-varying attribute are collected during the time instant. Each measurement has an associated reliability indicator that represents a relative reliability of said measurement. First, the reliability indicators for the measurements are filtered to produce a filtered reliability indicator, which includes a time-weighted historical reliability indicator. Then, the measurements are filtered to produce an estimated magnitude of the attribute for the current time instant. The estimated magnitude is determined using a time-weighted and reliability-weighted historical estimated magnitude of the time-varying attribute and a reliability-weighted average of the measurements. The reliability weighting of the reliability-weighted historical estimated magnitude and the reliability-weighted average of the measurements is performed using said filtered reliability indicator.

BRIEF DESCRIPTION OF THE DRAWINGS

For a more complete understanding of the present invention, reference is made to the following detailed description taken in conjunction with the accompanying drawings wherein:

FIG. 2 is an illustrative embodiment of a block diagram of a mobile telecommunications system for use in implementing the present invention;

DETAILED DESCRIPTION OF THE INVENTION

Figure 1:
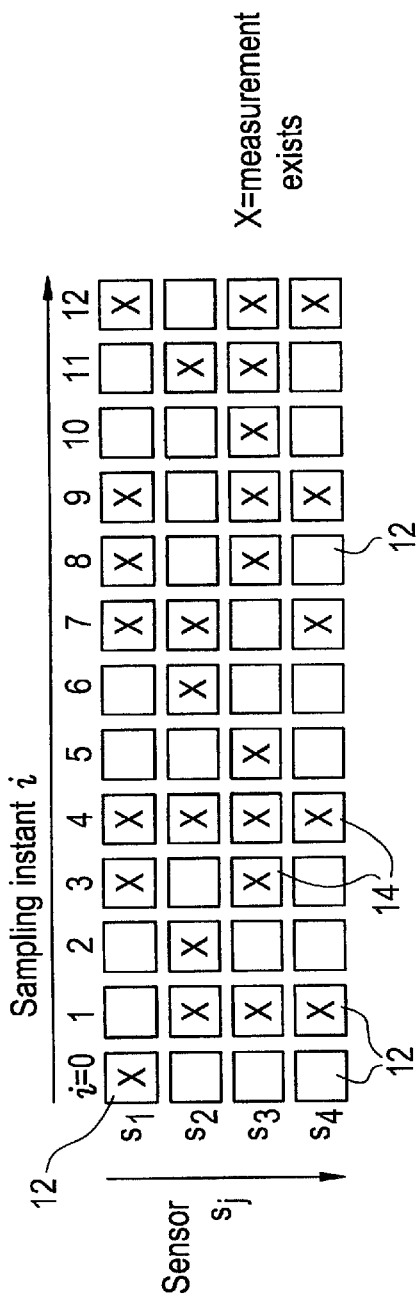
FIG. 1 is a schematic example of a situation in which measurements are intermittently received in parallel from a plurality of sensors.

Reference is now made to the Drawings wherein like reference characters denote like or similar parts throughout the various Figures. Referring now to FIG. 1, there is illustrated a schematic example of a situation in which measurements are intermittently received in parallel from a plurality of sensors. Data from four sensors $s_1$, $s_2$, $s_3$, and $s_4$ is intermittently received at certain sampling instants i. Although only four sensors and thirteen sampling instants are depicted, it will be understood by those skilled in the art that a measurement system can include any number of sensors and any number of sampling instants.

Each box 12 in the Figure represents a potential measurement at a certain sampling instant and for a certain sensor. Each X-mark 14 indicates that a measurement exists for the corresponding sensor at the particular sampling instant. As can be seen, a measurement is not received for each sensor at every sampling instant. For example, sensor $s_1$ received a measurement at sampling instant i=0, while sensors $s_2$, $s_3$, and $s_4$ did not.

Referring now to FIG. 2, there is depicted an illustrative embodiment of a block diagram of a mobile telecommunications system 2 for use in implementing the present invention. The mobile telecommunications system 2 includes a base transceiver station (BTS) 20 that is capable of transmitting signals to, and receiving signals from, a mobile station (MS) 22 over an air interface. In the illustrated example, downlink signals are transmitted from the base transceiver station 20 to the mobile station 22. The mobile station makes quality measurements on the received signals and filters the quality measurements to generate a quality estimate.

Although the illustrative embodiment involves determining an estimate based on measurements that are made on downlink signals, it will be understood that the invention is equally applicable to generate estimates from measurements on uplink signals or from other measurements in a telecommunications network. Furthermore, it will be understood by those of ordinary skill in the art that the invention is not limited to the telecommunications environment; rather, the invention can be used to generate estimates based on any type of time discrete measurement data. For example, the invention can be used to estimate temperatures for portions of, or for an entire inside of, a building in which one or more temperature sensors are installed in each room of the building.

Returning now to FIG. 2, the signals transmitted on a particular channel by the base transceiver station 20 in a time division multiple access (TDMA) system are divided into TDMA frames 24. Each TDMA frame 24 is further subdivided into a plurality of time slots 26. In this case, each TDMA frame includes eight time slots 26(0)–26(7). In connection with voice applications, each mobile station 22 that is communicating with the base transceiver station 20 on the particular channel is allocated one time slot 26. Voice data destined for the mobile station 22 is then transmitted within the allocated time slot 26.

In some situations, however, a mobile station 22 can be allocated more than one time slot 26 within each TDMA frame 24. For example, in connection with data communications (such as those supported by General Packet Radio Service (GPRS)), as opposed to voice communications, it is often desirable to increase the data transmission rate by transmitting data on multiple time slots 26. In the illustrated embodiment, the mobile station 22 has four allocated time slots 26(2)–26(5) in each TDMA frame 24. The mobile station 22 receives signals from the base transceiver station 20 at a transceiver 30. The data contained in the four allocated time slots 26(2)–26(5) is then extracted and buffered in a random access memory (RAM) 32. A microprocessor 34 retrieves the buffered data and processes the data, which can then be delivered to one or more peripheral devices 36, such as a speaker or a visual display, or which can be used by the microprocessor to perform control functions.

In accordance with the present invention, an unbiased estimation, or time-weighted and reliability-weighted average, of measurements from one or more sensors connected to the random access memory 32 can be calculated using a combination of auto-regressive filters. The measurements are processed such that the weights of the various measurements decrease exponentially with time. In addition, the possibility that the measurements and/or sensors might be intermittent or unequally reliable is taken into account. By calculating the estimate recursively, historical measurement storage is not necessary. Partial results can also be calculated by generating an estimate for subsets of the sensors. These partial results can then be reused to calculate an estimate based on all of the sensors. This technique allows partial results to be calculated with less complexity than if they were calculated separately.

For convenience of describing the invention, the set of all sensors is denoted by u in the following description. The set of all sensors can be divided into u subsets, which are denoted by $\sigma_k$, where k=1, ..., u. The individual sensors are denoted by $s_j$, where j=1, ..., $|\sigma|$, and the measurement taken at sampling instant i from sensor $s_j$ at time t−nT (i.e., time instant n) are denoted by $b_{n_i}^{(s_j)}$. As further discussed below, it should be noted that each time instant n can include one or more sampling instants i. A measurement reliability indicator, $x_{n_i}^{(s_j)} \geq 0$, associated with each measurement $b_{n_i}^{(s_j)}$ indicates the relative reliability of the measurement received for sampling instant i from sensor $s_j$ at time t−nT (i.e., time instant n). The estimate of the measurements from the set σ of all sensors is denoted by $S_n$, and the subset estimate of the measurements from a subset $\sigma_k$ of the sensors is denoted by $S_n^{(\sigma_k)}$.

During reception of signals by the mobile station 22, quality measurements are made on each time slot 26(2)–26(5). For example, each of a plurality of sensors $s_1, s_2, s_3$, and $s_4$ performs a quality measurement for a corresponding one of the plurality of time slots 26(2)–26(5) in each TDMA frame 24. The quality measurement might include, for instance, a degree of correlation between a known training sequence and a training sequence transmitted in each time slot 26(2)–26(5).

In addition, the existence and reliability of each quality measurement is indicated by a measurement reliability indicator. In one embodiment, the reliability indicator $x_{n_i}^{(s_j)}$ takes on one of two possible values: zero or one. A value of zero indicates that no quality measurement could be made for that sampling instant (corresponding to an empty box 12 in FIG. 1), and a value of one indicates that a quality measurement was made for that sampling instant (corresponding to a box 12 containing an X-mark 14 in FIG. 1). In such a case, at a sampling instant i where a measurement does not exist for a sensor (i.e., when $x_{n_i}^{(s_j)}=0$), a measured value of $b_{n_i}^{(s_j)}$ will not exist. It is assumed, however, that $b_{n_i}^{(s_j)}$ is assigned some value at these sampling instants, such as $b_{n_i}^{(s_j)}=0$. Such an assigned value will not affect the result. Alternatively, instead of assigning a value to $b_{n_i}^{(s_j)}$ for sampling instants i where a measurement does not exist for a sensor, the product $x_{n_i}^{(s_j)}b_{n_i}^{(s_j)}$ can simply be set to zero. In another embodiment, the reliability indicator can also take on other values. For example, when only a portion of the data in a time slot 26(2)–26(5) is actually received, the reliability indicator might be a value between zero and one (i.e., $0 \leq x_{n_i}^{(s_j)} \leq 1$) that is proportional to the amount of data actually received.

Using the quality measurements $s_j$ and their corresponding measurement reliability indicators $x_{n_i}^{(s_j)}$, the microprocessor 34 can generate a quality estimate $S_n$ in accordance with instructions stored in a read only memory (ROM) 38. As indicated by the subscript n, the quality estimate is associated with a particular time instant n. Accordingly, for each time instant n, measurements are sampled from the sensors, and the estimate $S_n$ is updated by taking into account the new measurements together with the prior calculated estimate $S_{n-1}$, which can be stored in the RAM 32. Each time instant n can correspond to a single sampling instant i, in which case the subscript i is superfluous. In such a case, however, the measurement is not necessarily performed instantaneously; rather, the measurement can be a function of the magnitude of the measured quantity during a period of time (e.g., a time window) around or associated with the particular time instant n.

In another alternative, each time instant n can include a plurality of sampling instants i (e.g., in FIG. 1, time instant n=0 might include sampling instants i=0–3, time instant n=1 might include sampling instants i=4–7, and so forth) Furthermore, the duration of the time instant can vary depending on the sampling frequency and the desired frequency at which the quality estimate is updated.

Figure 3:
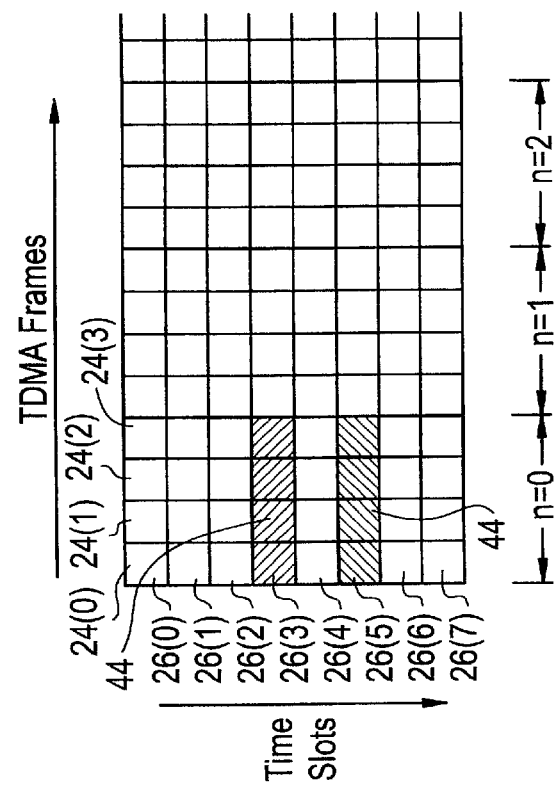
FIG. 3 is a schematic example of a multi-slot general packet radio service (GPRS) transmission for which the present invention can be used to generate a quality estimate.

For example, when the quality of a radio block is estimated in a receiver, the quality can, for instance, be the estimated bit error probability for the radio block. Frequently, a radio block spans several TDMA frames. In the case of GPRS and EGPRS, each radio block is transmitted during four TDMA frames. Referring now to FIG. 3, there is illustrated a schematic example of a multi-slot GPRS transmission for which the present invention can be used to generate a quality estimate. In this case, a receiving radio station has been allocated two different time slots 26(3) and 26(5) in the same TDMA frames 24. Two different radio blocks 44 are transmitted in parallel on the two time slots 26(3) and 26(5). In such a situation, it might be desirable to determine a quality estimate $S_n^{(\sigma_k)}$ for each radio block 44, based on quality measurements made during each TDMA frame 24 (e.g., wherein each time slot 26 in each TDMA frame 24 comprises a distinct sampling instant), and to also determine an overall quality estimate $S_n$ for both of the radio blocks 44 received by the radio station based on a combination of the separate radio block quality estimates $S_n^{(\sigma_k)}$. The radio blocks 44 can be considered to be concurrent in time, and thus belonging to the same time instant (e.g., n=0), even though the radio blocks 44 are actually interleaved in time. The quality estimates can then be recursively calculated for radio blocks 44 at subsequent time instants.

The time instant n=0 corresponds to the time when the measurement sequences start. As a consequence, the filters used in generating the estimate $S_n$ should be reset before the filtering starts (i.e., $S_{-1}=0$, $z_{-1}^{(\sigma_k)}=0$ (described below), etc.) to prevent old data that might no longer be relevant from influencing the new filtering process. Alternatively, the filters might be reset by setting them at an initial expected value for the applicable estimates and reliability indicators.

Returning again to FIG. 2, in accordance with another aspect of the invention, the microprocessor 34, based on instructions stored in the ROM 38, can recursively calculate a subset estimate $S_n^{(\sigma_k)}$ for each of a plurality of subsets $\sigma_k$ of the measurements. In an initial step, the sensors are partitioned into the smallest subsets for which partial results are desired, and the subset estimates $S_n^{(\sigma_k)}$ are calculated for each subset. In each consecutive step, two or more subset estimates $S_n^{(\sigma_k)}$ are joined together, giving new partial results $S_n^{(\sigma_k)}$ that represent an estimate for a larger subset of sensors. Finally, only one set containing all sensors remains, and the total estimate $S_n$ is achieved. This procedure can be performed in as many or as few steps as are desired. For instance, in the initial partition, the subsets might consist of only one sensor each. On the other hand, if partial results are not of interest, the sensors do not have to be partitioned at all; instead, the calculation can be performed in one step with only one "subset" containing all of the sensors.

In the initial step and in accordance with the instructions stored in the ROM 38, the microprocessor 34 partitions the sensors into u subsets $\sigma_k$, where k=1, . . . , u. A subset reliability indicator $x_n^{(\sigma_k)}$ for the measurements from the sensors in subset $\sigma_k$ at time instant n is then calculated by the microprocessor 34 according to:

$$x_n^{(\sigma_k)} = \sum_{s_j \in \sigma_k} x_{n_i}^{(s_j)} \qquad (2)$$

Next, the microprocessor 34 calculates a subset reliability-weighted average measurement $b_n^{(\sigma_k)}$ for the measurements from the sensors in subset $\sigma_k$ at time instant n:

$$b_n^{(\sigma_k)} = \frac{1}{x_n^{(\sigma_k)}} \sum_{s_j \in \sigma_k} x_{n_i}^{(s_j)} b_{n_i}^{(s_j)} \qquad (3)$$

In addition, the microprocessor 34 filters the subset reliability indicator $x_n^{(\sigma_k)}$ through a recursive auto-regressive filter:

$$z_n^{(\sigma_k)} = (1-\beta) z_{n-1}^{(\sigma_k)} \qquad (4)$$

where β is a parameter that determines how fast the relative weight of historical subset reliability indicator values decrease with time. The output of this filter at time n serves two purposes. First, it contains information on what weight the new subset reliability-weighted average measurement $b_n^{(\sigma_k)}$ has relative to older subset reliability-weighted average measurements $b_{n-1}^{(\sigma_k)}$, $b_{n-2}^{(\sigma_k)}$, etc. Second, the filtered subset reliability indicator $z_n^{(\sigma_k)}$ contains information on what weight the subset estimate (e.g., $S_n^{(\sigma_1)}$) has relative to the subset estimates (e.g., $S_n^{(\sigma_2)}$, $S_n^{(\sigma_3)}$) of the other subsets.

In some circumstances, it might be desirable to vary β depending upon how many time instants have passed. At time instant n=0, for example, no historical data will exist if the filters used in generating the estimate $S_n$ have been reset before the filtering starts (i.e., $S_{-1}$=0, $z_{-1}^{(\sigma_k)}$=0, etc.). At time instant n=0, therefore, β might be set at a value of one, but might decrease thereafter. Alternatively, Then, to generate a new subset estimate $S_n^{(\sigma_k)}$, the ROM 38 can be programmed to instruct the microprocessor 34 to use either of two similar approaches. In the first approach, the product $x_n^{(\sigma_k)} b_n^{(\sigma_k)}$ is filtered through an auto-regressive filter of the same form as the one used to filter the subset reliability indicator:

$$y_n^{(\sigma_k)} = (1-\beta) y_{n-1}^{(\sigma_k)} + \beta x_n^{(\sigma_k)} b_n^{(\sigma_k)} \qquad (5)$$

The subset estimate $S_n^{(\sigma_k)}$ can then be determined by dividing $y_n^{(\sigma_k)}$ by $z_n^{(\sigma_k)}$:

$$S_n^{(\sigma_k)} = \frac{y_n^{(\sigma_k)}}{z_n^{(\sigma_k)}} \qquad (6)$$

Similarly, by combining equations (5) and (6), and because:

$$S_{n-1}^{(\sigma_k)} = \frac{y_{n-1}^{(\sigma_k)}}{z_{n-1}^{(\sigma_k)}} \qquad (6a)$$

$S_n^{(\sigma_k)}$ can also be determined by:

$$S_n^{(\sigma_k)} = (1-\beta) \frac{S_{n-1}^{(\sigma_k)} z_{n-1}^{(\sigma_k)}}{z_n^{(\sigma_k)}} + \beta \frac{x_n^{(\sigma_k)} b_n^{(\sigma_k)}}{z_n^{(\sigma_k)}} \qquad (6b)$$

In the other approach, $b_n^{(\sigma_k)}$ is filtered through a different but similar recursive filter, for which the filter coefficients depend on the input and output of the subset reliability indicator filter:

$$\tau_n^{(\sigma_k)} = \beta \frac{x_n^{(\sigma_k)}}{z_n^{(\sigma_k)}} \qquad (7)$$

The subset estimate $S_n^{(\sigma_k)}$ can then be determined by another auto-regressive filter:

$$S_n^{(\sigma_k)} = (1 - \tau_n^{(\sigma_k)}) S_{n-1}^{(\sigma_k)} + \tau_n^{(\sigma_k)} b_n^{(\sigma_k)} \qquad (8)$$

Using either approach, the resulting estimate is the same: the value of the subset estimate $S_n^{(\sigma_k)}$ for the sensors in subset $\sigma_k$. In fact, both approaches produce the same subset estimate that includes historical estimate weighting (through the use of the historical subset estimate $S_{n-1}^{(\sigma_k)}$ time-weighted by a factor (1−β), historical reliability weighting (through the use of the historical weighted subset reliability indicator $z_n^{(\sigma_k)}$), and reliability weighting of the individual measurements (through the use of the subset reliability-weighted average measurement $b_n^{(\sigma_k)}$). In particular, in accordance with the historical reliability-weighting and in addition to the time-weighting provided by the β and (1−β) factors, the historical subset estimate $S_{n-1}^{(\sigma_k)}$ is given less relative weight, and the subset reliability-weighted average measurement $b_n^{(\sigma_k)}$ is given more relative weight, when the subset reliability indicator indicates that the current measurements are more reliable than the historical estimate (i.e., when $x_n^{(\sigma_k)} \geq z_n^{(\sigma_k)}$). Similarly, the historical subset estimate $S_{n-1}^{(\sigma_k)}$ is given more relative weight, and the subset reliability-weighted average measurement $b_n^{(\sigma_k)}$ is given less relative weight, when the subset reliability indicator indicates that the current measurements are less reliable than the historical estimate (i.e., when $x_n^{(\sigma_k)} \leq z_n^{(\sigma_k)}$).

Once the subset estimates $S_n^{(\sigma_k)}$ and the filtered subset reliability indicators $z_n^{(\sigma_k)}$ have been calculated for all u of the subsets, some of the subsets are joined or combined together by the microprocessor 34 to form a larger subset $\sigma_{k'}$ (e.g., consisting of subsets $\sigma_1, \ldots, \sigma_q$, where q≤u). An estimate $S_n^{(\sigma_k)}$ for the larger subset is then calculated as a reliability-weighted average of the subsets to be joined:

$$S_n^{(\sigma_k)} = \sum_{h=1}^{q} p_h S_n^{(\sigma_h)} \qquad (9)$$

where $$p_h = \frac{z_n^{(\sigma_h)}}{\sum_{h=1}^{q} z_n^{(\sigma_h)}} \qquad (10)$$

For use in later combining steps, the microprocessor 34 also calculates a filtered subset reliability indicator $z_n^{(\sigma_k)}$ for the larger subset $\sigma_{k'}$:

$$z_n^{(\sigma_{k'})} = \sum_{h=1}^{q} z_n^{(\sigma_h)} \qquad (11)$$

This combining procedure is repeated until all desired subset estimates have been determined. For each repetition, the partial results can be temporarily stored in the RAM 32 until they are needed by the microprocessor 34 to calculate the next larger subset estimate and filtered reliability indicator. By combining the subset estimates for progressively larger subsets, a single estimate $S_n$ for the set σ of all sensors at time instant n can be determined. In the mobile telecommunications environment, the subset and overall estimates $S_n$, $S_n^{(\sigma_k)}$, and/or $S_n^{(\sigma_k)}$ can be used by the microprocessor 34 in the mobile station 22 to evaluate the signal quality for purposes of, for example, determining if a handoff to another base transceiver station 20 (i.e., in a neighboring cell) is necessary, determining if a request for a data retransmission is necessary, or adapting the robustness of the transmission to the channel quality (e.g., to select a suitable channel coding scheme and/or modulation scheme). Alternatively, the estimates might be sent over the air interface to the serving base transceiver station 20 for use in performing such decisions or for use in performing some other analysis by the telecommunications system 2.

Figure 4:
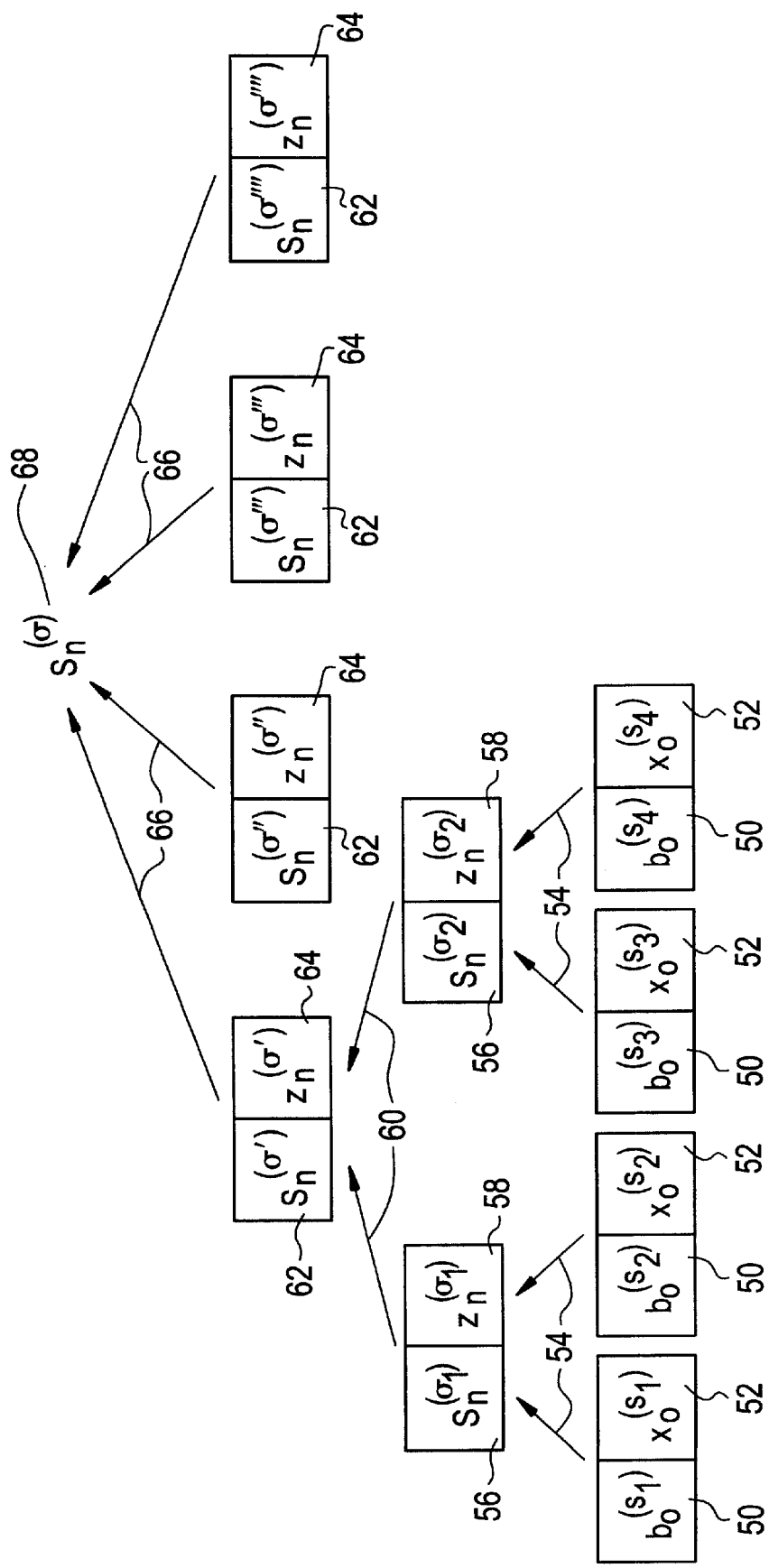
FIG. 4 is a schematic example of a recursive filtering process in accordance with the present invention.

Referring now to FIG. 4, there is illustrated a schematic example of a recursive filtering process in accordance with the present invention. Initially, a number of measurements 50 (denoted by $b_n^{(s_j)}$) are taken at time instant n by each of a plurality of sensors $s_j$. Each measurement 50 has an associated reliability indicator 52 (denoted by $x_n^{(s_j)}$). The measurements 50 and their associated reliability indicators are then filtered (as indicated at 54) through auto-regressive filters (in accordance with equations (2)–(6) or equations (2)–(4), (7), and (8) above) to generate subset estimates 56

(denoted by $S_n^{(\sigma_k)}$) and filtered subset reliability indicators 58 (denoted by $z_n^{(\sigma_k)}$) for a subset $\sigma_k$ of measurements at time instant n.

Next, the subset estimates 56 and filtered subset reliability indicators 58 are combined (as indicated at 60) by a combiner (in accordance with equations (9)–(11) above) to generate a larger subset estimate 62 (denoted by $S_n^{(\sigma_k')}$ and a filtered larger subset reliability indicator 64 (denoted by $z_n^{(\sigma_k')}$). The larger subset estimate 62 and filtered larger subset reliability indicator 64 can further be combined (as indicated at 66, again in accordance with equations (9)–(11) above) with other larger subset estimates 62 (denoted by $S_n^{(\sigma'')}, S_n^{(\sigma''')}$, etc.) and other filtered larger subset reliability indicators 64 (denoted by $z_n^{(\sigma'')}, z_n^{(\sigma''')}$, etc.) to generate an overall estimate 68 (denoted by $S_n$) for the measurements at time instant n and, if desired, a filtered overall reliability indicator $z_n$. These other larger subset estimates 62 and filtered larger subset reliability indicators 64 can be generated from initial measurements in the same or a similar manner as indicated by steps 54 and 60.

Referring now to FIGS. 2 and 4, the recursive filtering process of the present invention can be used by the mobile telecommunications system 2 so as to filter measurements in different ways and for different sampling instants i and time instants n. For example, each TDMA frame 24 might correspond to a sampling instant i, wherein measurements 50 and 52 on the time slots 26(2)–26(5) received by the mobile station 22 within each TDMA frame 24 are made by each of a plurality of sensors $s_1, s_2, s_3$, and $s_4$. In other words, a first TDMA frame 24(0) would correspond to i=0, wherein a quality measurement 50 on time slot 26(2) would be performed by a first sensor $s_1$, a quality measurement 50 on time slot 26 (3) would be performed by a second sensor $s_2$, and so forth. These measurements 50 and 52 could then be filtered and combined (as indicated at 54 and 60) to generate a subset estimate 62 and subset reliability indicator 64 for the measurements in the first TDMA frame 24(0), wherein the subset comprises the measurements taken during sampling instant i=0.

Other subset estimates 62 and subset reliability indicators 64 could also be generated for the measurements in the second, third, and fourth TDMA frames 24(1), 24(2), and 24(3) (corresponding to sampling instants i=1, i=2, and i=3). These various subset estimates 62 and subset reliability indicators 64 could then be combined (as indicated at 66) to form an estimate 68 for the set $\sigma$ of all mobile station measurements 50 taken during a time instant n that includes the four depicted TDMA frames 24(0)–24(3).

As an alternative example, each TDMA frame 24 might correspond to a time instant n, wherein measurements 50 and 52 on each time slot 26(2)–26(5) received by the mobile station 22 are made by each of a plurality of sensors $s_1, s_2, s_3$, and $s_4$. In other words, four different quality measurements are made on each time slot 26 for each sampling instant i, wherein sampling instant i=0 corresponds to time slot 26(2), sampling instant i=1 corresponds to time slot 26(3), and so on. The measurements 50 and 52 for each time slot 26 could then be filtered and combined (as indicated at 54 and 60) to generate a subset estimate 62 and subset reliability indicator 64 for the measurements in that time slot 26 (i.e., where subset estimate $b_n^{\sigma_1}$ includes measurements $b_{n_1}^{s_1}, b_{n_1}^{s_2}, b_{n_1}^{s_3}$, and $b_{n_1}^{s_4}$; subset estimate $b_n^{\sigma_2}$ includes measurements $b_{n_2}^{s_1}, b_{n_2}^{s_2}, b_{n_2}^{s_3}$, and $b_{n_2}^{s_4}$; and so forth). The subset estimates 62 and subset reliability indicators 64 for the different time slots 26 could then be combined (as indicated at 66) to form an estimate 68 for the set $\sigma$ of all mobile station measurements 50 taken during a time instant n that corresponds to the first TDMA frame 24(0).

Figure 5:
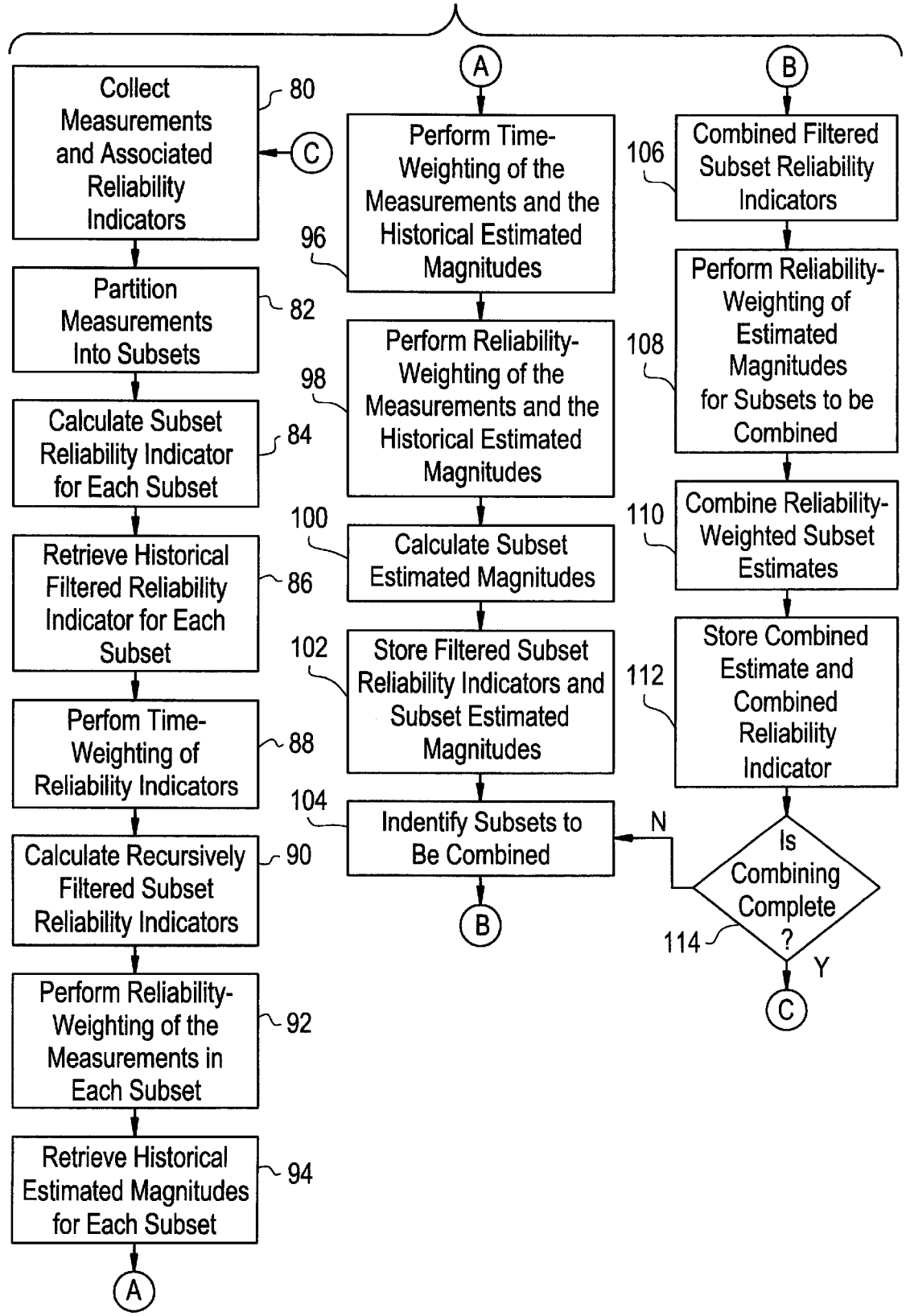
FIG. 5 is a flow diagram of a method for recursively filtering measurement data to generate an estimate of a time-varying attribute, such as a quality measurement of a radio signal, at a particular time instant.

Referring now to FIG. 5, there is illustrated a flow diagram of a method for recursively filtering measurement data to generate an estimate of a time-varying attribute, such as a quality measurement of a radio signal, at a particular time instant. When the filtering method is initiated, any stored filter values are reset to zero (i.e., $S_{-1}=0, z_{-1}^{(\sigma_k)}=0$, etc., to prevent old data that might no longer be relevant from influencing the new filtering process). At a first step 80, measurements and their associated reliability indicators are collected during a particular time instant. In some cases, measurements might be missing for some sampling instants within the particular time instant. In such a case, the missing measurement is assigned some value but is given an associated reliability indicator of zero to indicate that the measurement value is entirely unreliable. Measurements that are successfully collected, on the other hand, are assigned a non-zero value that depends upon the degree of reliability of the measurement and the sensor used to collect the measurement.

The collected measurements are then partitioned into subsets at step 82. This partitioning can be performed, for instance, by the microprocessor 34 in FIG. 2 in accordance with a preselected partitioning scheme stored in the ROM 38. For each subset, a subset reliability indicator is calculated at step 84 from the individual reliability indicators associated with the measurements in that subset (e.g., in accordance with equation (2) above). In addition, at step 86, historical filtered reliability indicators for each subset (i.e., from a prior time instant) are retrieved from a memory, such as a RAM 32. The subset reliability indicator and the historical filtered reliability indicators for each subset are then time-weighted by factors $\beta$ and $(1-\beta)$, respectively, at step 88, and recursively filtered subset reliability indicators are calculated for each subset at step 90 (e.g., in accordance with equation (4) above).

Using the individual reliability indicators, a reliability-weighted average of the measurements in each subset is determined at step 92 (e.g., in accordance with equation (3) above). Next, historical estimated magnitudes for each subset (i.e., from a prior time instant) are retrieved at step 94. These historical estimated magnitudes for each subset and the reliability-weighted average of the measurements in each subset are time-weighted by factors $(1-\beta)$ and $\beta$, respectively, at step 96. In addition, the historical estimated magnitudes for each subset and the reliability-weighted average of the measurements in each subset are further reliability-weighted at step 98 using the corresponding filtered subset reliability indicators for each subset. In particular, the historical estimated magnitudes for each subset are reliability-weighted according to a ratio of the historical filtered reliability indicator for that subset to the filtered subset reliability indicator for that subset for the current time instant. In addition, the reliability-weighted average of the measurements in each subset are further reliability-weighted according to a ratio of the current subset reliability indicator for that subset to the filtered subset reliability indicator for that subset for the current time instant. Next, estimated magnitudes are determined for each subset from the time-weighted and reliability-weighted historical estimated magnitudes and averages of the measurements at step 100. In particular, steps 96–100 correspond to the calculations shown in each of equations (5) and (6), equation (6b), and equations (7) and (8) set forth above.

The current filtered subset reliability indicators and the current estimated magnitudes for each subset are stored in a memory, such as RAM 32, at step 102. These parameters can take the place of their corresponding historical parameters for use in subsequent time instants.

At step 104, particular ones of the subsets are identified to be combined into larger subsets. Accordingly, the filtered subset reliability indicators for the subsets are combined at step 106 (e.g., using equation (11) above). In addition, the estimated magnitudes for the subsets to be combined are reliability-weighted at step 108 using the filtered subset reliability indicators calculated at step 90 and stored at step 102. In particular, the estimated magnitude of each subset to be combined is reliability-weighted in accordance with a ratio of the filtered subset reliability indicator associated with that subset to a total filtered reliability indicator for all of the subsets to be combined (e.g., using equation (10) above) The reliability-weighted estimated magnitudes for the subsets are then combined at step 110 (e.g., using equation (9) above).

The combined estimated magnitudes and the combined reliability indicators are then stored in a memory at step 112 for use in subsequent combining steps. At step 114, it is determined whether the combining is complete. In other words, it is determined whether all of the subsets have been combined to form a single estimated magnitude. If not, then the process continues at step 104 with an identification of selected ones of the larger subsets generated at steps 106 and 110 that are to be further combined. If, on the other hand, the combining procedure is complete, the process begins again at step 80 for a subsequent time instant. In the subsequent time instant, the parameters stored at steps 102 and 112 become the historical parameters that are retrieved at steps 86 and 94.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for recursive filtering of time discrete measurement data relating to a measurable time-varying attribute to generate an estimated magnitude for the attribute at a particular time instant, comprising the steps of:

collecting at least one measurement of the time-varying attribute during said time instant, wherein each said measurement has associated therewith a reliability indicator representing a relative reliability of said measurement;

filtering the reliability indicators for the at least one measurement to produce a filtered reliability indicator, said filtered reliability indicator including a time-weighted historical reliability indicator, wherein the historical reliability indicator includes information relating to a relative reliability of at least one measurement collected prior to said time instant;

filtering the at least one measurement to produce an estimated magnitude of said attribute for said time instant, said estimated magnitude including:

a time-weighted and reliability-weighted historical estimated magnitude, wherein the historical estimated magnitude includes information relating to at least one measurement of the time-varying attribute collected prior to said time instant; and a reliability-weighted average of said at least one measurement, said reliability weighting of the reliability-weighted historical estimated magnitude and the reliability-weighted average of said at least one measurement performed using said filtered reliability indicator.

2. The method of claim 1, wherein the at least one measurement of the time-varying attribute comprises a first subset of a plurality of measurements, said filtered reliability indicator and said estimated magnitude associated with the first subset, the method further comprising the steps of:

collecting at least one other measurement of the time-varying attribute during the time instant, wherein each said at least one other measurement has associated therewith a reliability indicator representing a relative reliability of said measurement, said at least one other measurement comprising a second subset of the plurality of measurements;

filtering the reliability indicators for the at least one other measurement to produce a filtered reliability indicator associated with the second subset;

filtering the at least one other measurement to produce an estimated magnitude associated with the second subset; and combining the estimated magnitude associated with the first subset with the estimated magnitude associated with the second subset to produce a larger subset estimated magnitude of the time-varying attribute for the time instant for a larger subset of the plurality of measurements, said larger subset including at least the first and second subsets of the plurality of measurements.

3. The method of claim 2, wherein the step of combining the first subset estimated magnitude with the second subset estimated magnitude to produce the larger subset estimated magnitude includes reliability-weighting the first subset estimated magnitude using the first subset filtered reliability indicator and reliability-weighting the second subset estimated magnitude using the second subset filtered reliability indicator.

4. The method of claim 3, wherein the reliability-weighting of the first subset estimated magnitude is performed in accordance with a ratio of the first subset reliability indicator to a reliability indicator for all of the plurality of measurements in the larger subset and the reliability-weighting of the second subset estimated magnitude is performed in accordance with a ratio of the second subset reliability indicator to the reliability indicator for all of the plurality of measurements in the larger subset.

5. The method of claim 2, wherein the larger subset comprises all of the plurality of measurements.

6. The method of claim 2, wherein at least one of the plurality of measurements comprises an assigned value indicating that no measurement data was collected for said at least one of the plurality of measurements.

7. The method of claim 1, wherein the at least one measurement comprises a plurality of measurements.

8. The method of claim 7, further comprising the step of determining the reliability-weighted average of said plurality of measurements, said step of determining comprising:

calculating the product of each measurement and the associated reliability indicator for each of the plurality of measurements; and combining the calculated products for the plurality of measurements.

9. The method of claim 8, wherein the step of determining the reliability-weighted average of said plurality of measurements further comprises:

weighting the combined calculated products according to a ratio of the sum of the reliability indicators associated with the measurements to the filtered reliability indicator.

10. The method of claim 1, wherein the historical reliability indicator and the historical estimated quantity are time-weighted by a factor $(1-\beta)$, where $\beta$ comprises a preselected parameter that determines how fast weight of the historical reliability indicator and the historical estimated quantity decrease with time.

11. The method of claim 10, wherein the reliability-weighted average of said at least one measurement is further weighted by the parameter $\beta$.

12. The method of claim 10, wherein the step of filtering the reliability indicators for the at least one measurement to produce a filtered reliability indicator comprises the step of combining the reliability indicators for the at least one measurement to form a combined reliability indicator, the filtered reliability indicator including the combined reliability indicator weighted by the parameter $\beta$.

13. The method of claim 1, wherein the at least one measurement of the time-varying attribute comprises at least one quality measurement of at least one signal in a telecommunications network.

14. The method of claim 13, wherein the at least one quality measurement indicates a quality of the at least one signal transmitted over an air interface in a mobile telecommunications network.

15. The method of claim 1, further comprising the step of determining the time-weighted and reliability-weighted historical estimated quantity, wherein said step of determining comprises weighting the historical estimated quantity according to a ratio of the historical reliability indicator to the filtered reliability indicator.

16. The method of claim 15, further comprising the step of determining the reliability-weighted average of said at least one measurement according to a ratio of the sum of the reliability indicators associated with the at least one measurement to the filtered reliability indicator.

17. The method of claim 1, wherein the historical estimated quantity comprises an estimated quantity of said attribute for a prior time instant.

18. The method of claim 1, wherein the at least one measurement of the time-varying attribute is collected by at least one sensor.

19. The method of claim 1, wherein the step of collecting at least one measurement of the time-varying attribute during said time instant comprises:

identifying at least one sampling instant within said time instant;

attempting to collect measurement data at each sampling instant;

assigning at least one measurement value for each sampling instant regardless of whether the attempt to collect measurement data succeeded;

assigning a zero value to the reliability indicator associated with each measurement for which the attempt to collect measurement data failed; and assigning a non-zero value to the reliability indicator associated with each measurement for which the attempt to collect measurement data succeeded.

20. The method of claim 1, further comprising the step of determining the time-weighted and reliability-weighted historical estimated quantity, wherein said step of determining comprises weighting the historical estimated quantity according to:

$$1 - \beta \frac{x}{z}$$

where $\beta$ comprises a preselected parameter that determines how fast weight of the historical reliability indicator and the historical estimated quantity decrease with time, x comprises a sum of the reliability indicators associated with the measurements, and z comprises the filtered reliability indicator.

21. An apparatus for recursively filtering measurement data, comprising:

a buffer for storing a plurality of measurements of a time-varying attribute, wherein each said measurement has associated therewith a reliability indicator representing a relative reliability of said measurement, each of said measurements of the time-varying attribute made during a particular time instant;

a memory for storing filtering instructions, said filtering instructions used to generate an estimated magnitude for the time-varying attribute at the particular time instant; and a processor for filtering the plurality of measurements in accordance with the filtering instructions, said processor operating to:

time-weight a historical estimated magnitude, wherein the historical estimated magnitude includes information relating to at least one measurement of the time-varying attribute collected prior to the particular time instant; and generate a weighted average of the plurality of measurements using the reliability indicator associated with each of the plurality of measurements; and generate an estimated magnitude of the time-varying attribute for the particular time instant using the weighted historical estimated magnitude and the weighted average of the plurality of measurements.

22. The apparatus of claim 21, wherein the processor further operates to:

filter the reliability indicators associated with the plurality of measurements to produce a filtered reliability indicator, said filtered reliability indicator determined using a time-weighted historical reliability indicator, wherein the historical reliability indicator includes information relating to a relative reliability of at least one measurement collected prior to said time instant;

reliability-weight the time-weighted historical estimated magnitude and the weighted average of the plurality of measurements using the filtered reliability indicator; and wherein the generation of the estimated magnitude of the time-varying attribute for the particular time instant includes using the reliability-weighted and time-weighted historical estimated magnitude and the reliability-weighted average of the plurality of measurements.

23. The apparatus of claim 22, wherein:

the weighted average of the plurality of measurements is reliability-weighted according to a ratio of a sum of the reliability indicators associated with the plurality of measurements to the filtered reliability indicator; and the time-weighted historical estimated magnitude is reliability-weighted according to a ratio of the historical reliability indicator to the filtered reliability indicator.

24. The apparatus of claim 22, wherein:

the time-weighting of the historical reliability indicator includes time-weighting said historical reliability indicator by a factor $(1-\beta)$ where $\beta$ comprises a preselected parameter that determines how fast weight of the historical reliability indicator and the historical estimated quantity decrease with time; and said filtered reliability indicator is further determined using a combination of the reliability indicators associated with the plurality of measurements, said combination weighted by a factor $\beta$.

25. The apparatus of claim 22, wherein the historical estimated quantity comprises an estimated quantity of the time-varying attribute for a prior time instant.

26. The apparatus of claim 22, wherein each of the plurality of measurements comprises a quality measurement of a signal in a telecommunications network.

27. The apparatus of claim 21, further comprising at least one sensor for collecting the plurality of measurements.

28. The apparatus of claim 27, wherein a quantity of measurements collected during a prior time instant differs from a quantity of measurements included in the plurality of measurements, wherein the processor further operates to further weight the historical estimated magnitude and the weighted average of the plurality of measurements to account for said difference in generating the estimated magnitude of the time-varying attribute for the particular time instant.

29. The apparatus of claim 27, wherein the at least one sensor operates to:

attempt to collect measurement data during at least one sampling instant of the particular time instant;

assign at least one measurement value for each sampling instant regardless of whether the attempt to collect measurement data succeeded;

assign a zero value to the reliability indicator associated with each measurement for which the attempt to collect measurement data failed; and assign a non-zero value to the reliability indicator associated with each measurement for which the attempt to collect measurement data succeeded.

30. The apparatus of claim 21, wherein the plurality of measurements are unequally reliable.

31. The apparatus of claim 21, wherein the generation of the weighted average of the plurality of measurements includes:

calculating the product of each measurement and the reliability indicator associated with the measurement; and combining the calculated products for the plurality of measurements.

32. The apparatus of claim 21, wherein the time-weighting of the historical estimated magnitude includes time-weighting said historical estimated magnitude by a factor $(1-\beta)$, where $\beta$ comprises a preselected parameter that determines how fast weight of the historical estimated quantity decreases with time, and wherein the generation of the weighted average of the plurality of measurements further includes time-weighting the weighted average of the plurality of measurements by a factor $\beta$.

33. A method for recursive filtering of time discrete measurement data relating to a measurable time-varying attribute to generate a reliability of the measurement data at a particular time instant, comprising the steps of:

collecting at least one measurement of the time-varying attribute during said time instant, wherein each said measurement has associated therewith a reliability indicator representing a relative reliability of said measurement;

filtering the reliability indicators for the at least one measurement to produce a filtered reliability indicator, said filtered reliability indicator including a time-weighted historical reliability indicator, wherein the historical reliability indicator includes information relating to a relative reliability of at least one measurement collected prior to said time instant.

34. The method of claim 33, wherein the historical reliability indicator comprises a filtered reliability indicator for a prior time instant.

35. An apparatus for recursively filtering measurement data, comprising:

a buffer for storing a plurality of measurements of a time-varying attribute, wherein each said measurement has associated therewith a reliability indicator representing a relative reliability of said measurement, each of said measurements of the time-varying attribute made during a particular time instant;

a memory for storing filtering instructions, said filtering instructions used to generate an estimated magnitude for the time-varying attribute at the particular time instant; and a processor for filtering the plurality of measurements in accordance with the filtering instructions, said processor operating to:

filter the reliability indicators associated with the plurality of measurements to produce a filtered reliability indicator, said filtered reliability indicator determined using a time-weighted historical reliability indicator, wherein the historical reliability indicator includes information relating to a relative reliability of at least one measurement collected prior to said time instant;

time-weight a historical estimated magnitudes wherein the historical estimated magnitude includes information relating to at least one measurement of the time-varying attribute collected prior to the particular time instant;

reliability-weight the historical estimated magnitude using the filtered reliability indicator;

reliability-weight the plurality of measurements using the filtered reliability indicator to produce a reliability-weighted average of the plurality of measurements; and generate an estimated magnitude of the time-varying attribute for the particular time instant using the reliability-weighted and time-weighted historical estimated magnitude and the reliability-weighted average of the plurality of measurements.

* * * * *